United States Patent [19]

Reinhart

[11] Patent Number: 5,714,231
[45] Date of Patent: Feb. 3, 1998

[54] DECORATIVE LAYER STRUCTURE AND USE THEREOF

[75] Inventor: Werner Reinhart, Nürnberg, Germany

[73] Assignee: Leonhard Kurz GmbH & Co., Furth, Germany

[21] Appl. No.: 535,082

[22] PCT Filed: Feb. 8, 1994

[86] PCT No.: PCT/DE94/00137

§ 371 Date: Oct. 12, 1995

§ 102(e) Date: Oct. 12, 1995

[87] PCT Pub. No.: WO94/25288

PCT Pub. Date: Nov. 10, 1994

[30] Foreign Application Priority Data

Apr. 24, 1993 [DE] Germany .................. 43 13 521.8

[51] Int. Cl.[6] ........................................... B32B 3/00
[52] U.S. Cl. .................. 428/156; 428/161; 428/164; 428/172; 428/201; 428/203; 428/206; 428/209; 428/542.2; 428/42.1; 428/41.8
[58] Field of Search .................... 428/156, 172, 428/161, 164, 201, 203, 206, 209, 542.2, 42.1, 41.8

[56] References Cited

U.S. PATENT DOCUMENTS

| | | | |
|---|---|---|---|
| 4,629,647 | 12/1986 | Sauder | 428/122 |
| 4,717,615 | 1/1988 | Reinhart | 428/161 |
| 4,856,857 | 8/1989 | Takeuchi et al. | 350/3.6 |
| 4,945,215 | 7/1990 | Fukushima et al. | 235/457 |
| 5,010,243 | 4/1991 | Fukushima et al. | 235/488 |

FOREIGN PATENT DOCUMENTS

| | | |
|---|---|---|
| 2352366 | 10/1972 | Germany . |
| 3422910 | 9/1985 | Germany . |
| 4130896 | 7/1992 | Germany . |
| 653161 | 12/1985 | Switzerland . |
| 655509 | 4/1986 | Switzerland . |

*Primary Examiner*—Donald Loney
*Attorney, Agent, or Firm*—Louis E. Marn

[57] ABSTRACT

Proposed is a decorative layer structure and a hot stamping foil having such a layer structure, wherein provided at the inner surface of a cover lacquer layer at least in a region-wise manner is a spatial structure having an optical-diffraction effect, which in turn is provided in regions with a decorative lacquer layer before a reflecting layer which makes the spatial structure optically clearly visible is applied.

10 Claims, 1 Drawing Sheet

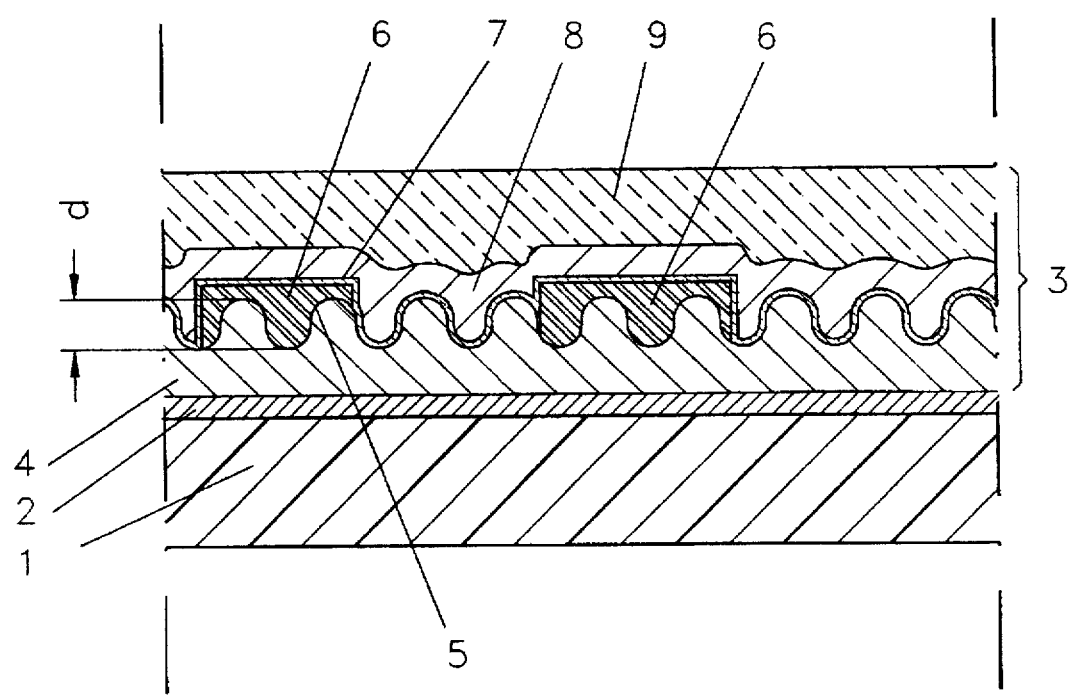

DECORATIVE LAYER STRUCTURE AND USE THEREOF

BACKGROUND OF THE INVENTION

1. Field of the Invention

The invention relates to a decorative layer structure which has at least one transparent cover lacquer layer which at its surface that is concealed in use is provided at least in a region-wise manner with a spatial structure having an optical-diffraction effect, and a reflecting layer at least in the region of the spatial structure. In addition the invention concerns the use of a decorative layer structure of that kind.

2. Description of Prior Art

Decorative layer structures or arrangements of the above-mentioned kind are very widely used for example as security elements for value documents such as for example banknotes, credit cards, identity cards or tickets. In that respect the term 'spatial structure having an optical-diffraction effect' means structures which produce quite specific effects by diffraction or refraction of the incident light. Structures of that kind having an optical-diffraction effect may be for example holograms, computer-generated diffraction structures, interference layers or diffraction gratings.

DE 41 30 896 A1 discloses a composite layer arrangement of the kind mentioned in the opening part of this specification, in which a dielectric with a refractive index of N=2.5 is used as a reflection layer. The lacquer layers which adjoin the structure having the optical-diffraction effect, at both sides thereof, are each provided over the entire surface area, in the known composite layer arrangement.

German laid-open application (DE-CS) No 23 52 366 discloses an identity card which is provided in a region-wise manner with a spatial structure having an optical-diffraction effect. In that arrangement, two layers having substantially identical refractive indices enclose in a region-wise manner a layer of material whose refractive index differs from that of the two enclosing layers. The spatial structure having the optical-diffraction effect is provided in the one layer only in the region in which the material with the different refractive index is present.

In general structures of that kind having an optical-diffraction effect are applied to the document to be safeguarded in such a way that they cover over only a limited area thereof. Stamping or punch members of a suitable configuration are usually employed to produce decorative layer structures having such optical-diffraction structures which occupy only a restricted area. Now, particularly when, in addition to the structure having the optical-diffraction effect, other security elements, for example a special item of printing, are also to be provided, the problem arises of accurately mutually aligning the stamping or punch member for producing the structure having the optical-diffraction effect, relative to the other security elements, for example the printing. Accordingly, hitherto either a comparatively high degree of inaccuracy in registration of the various security elements with each other had to be tolerated, or a comparatively large amount of waste occurs in the course of manufacture, in spite of low working speeds.

OBJECT OF THE INVENTION

The object of the present invention is now to afford remedies in this respect and to propose a possibility which allows structures having an optical-diffraction effect of the above-discussed kind to be provided in a decorative layer structure only in a region-wise manner, but nonetheless while being able to apply additional security elements, for example a special item of printing, with a very high degree of accuracy, at relatively high production speeds, or being able to produce at least highly accurate positioining of the structures which have an optical-diffraction effect and which are present only in a region wise manner.

SUMMARY OF THE INVENTION

To attain that object, in accordance with the invention, it is proposed that a decorative layer structure of the above-mentioned kind is so-designed that provided in a region-wise manner between the surface of the cover lacquer layer, said surface having the spatial structure having an optical-diffraction effect, and the reflecting layer, is a further decorative lacquer layer which fills the spatial structure and whose thickness corresponds at least to the depth of the spatial structure and which is formed by a lacquer whose basic composition has a refractive index which differs from that of the transparent cover lacquer by less than 0.8.

As can be seen from the above-depicted configuration of the decorative layer structure, it is no longer necessary for accurate positioning of the spatial structure having the optical-diffraction effect already to be effected during the operation of embossing the spatial structure. On the contrary, with the configuration according to the invention, the spatial structure having the optical-diffraction effect is introduced into the cover lacquer layer over a surface area which is larger than the area in which a spatial structure is to be present. Nonetheless the person viewing the decorative layer structure has an impression as though the spatial structure were present only precisely in the desired region, more specifically for the reason that the depressions and raised portions of the spatial structure are levelled off by means of the decorative lacquer layer outside the region in which the structure is wanted, in which case—as seen from the viewer's side—the reflecting layer is present on the one hand behind the decorative lacquer layer which fills the spatial structure and on the other hand, in the regions in which there is no additional decorative lacquer layer, immediately behind the spatial structure. Accordingly, in the case of the decorative layer structure according to the invention, accurate positioning of the spatial structure is produced not by suitably accurate alignment of a stepping or punch member or the like, but by virtue of the application of an additional decorative lacquer layer for filling the spatial structure, before the reflecting metal layer is applied. The additional decorative lacquer layer can be produced here for example by a printing process, so that it is comparatively easily possible to achieve accurate alignment. Even if, subsequent to the operation of applying the decorative lacquer layer, the metallization operation is effected and it is only then that further printing is applied, accurate registration usually does not give rise to excessive difficulties.

A procedure in accordance with the invention therefore quite considerably simplifies the production of a decorative layer structure with a spatial structure which has an optical-diffraction effect and which is provided only in a region-wise manner, while in the simplest case production can be effected in such a way that the entire surface of the cover lacquer layer which is to be provided in a region-wise manner with the spatial structure is provided with a spatial structure having an optical-diffraction effect, which can be very easily produced, for example by means of suitably profiled rollers. Then, in a second working operation, a suitable decorative lacquer layer is applied to fill the spatial structure in a region-wise manner, in which case the slight difference in refractive index between the transparent cover lacquer and the base substance of the decorative lacquer layer provides that the interface between the cover lacquer layer and the decorative lacquer layer is not visible under normal circumstances. In this connection the terms 'base composition' or 'base substance' of the decorative lacquer layer mean the lacquer base without pigments and fillers.

In the normal case the decorative lacquer layer—like the cover lacquer layer—will be formed by a transparent lacquer, in which respect those transparent lacquers may obviously be colored in order for example to give an impression of gold when using a reflecting layer of aluminium.

For particular situations of use however it is also possible to use a decorative lacquer layer which is formed by a pigmented layer. However, in spite of the presence of the pigments in the decorative lacquer layer, if the base composition has a suitable refractive index, this provides that the structured interface between the cover lacquer layer and the decorative lacquer layer is not visible. However, for example when using a pigmented decorative lacquer layer, it is possible to achieve additional special effects because in fact in that case the reflecting layer, on the side of the decorative lacquer layer which is away from the viewer in the condition of use, is not visible.

A metal layer which is applied by vapor deposition in a vacuum, for example an aluminium or chromium layer, is desirably used as the reflecting layer, in per se known manner. Another possibility is that of using a dielectric with a refractive index of at least 2, as the reflecting layer.

As the foregoing description shows the decorative layer structure according to the invention can be used for a very wide range of areas of use. A particularly advantageous use however is as a component of the transfer layer assembly of a stamping foil, in particular a hot stamping foil, comprising a carrier film and a transfer layer assembly which can be fixed to a substrate by means of an adhesive layer and which can be detached from the carrier film, in which case the cover lacquer layer serves as a protective lacquer layer forming the free surface of the decorated substrate. The individual layers of a hot stamping foil of that kind can be formed in the usual manner, in which case for example the per se known combinations with magnetic layers etc are also possible. In that case for example the decorative lacquer layer can be formed by a magnetizable lacquer, in which case there is additionally the advantage that the magnetic layer is not separated from the decorative lacquer layer by the metallization, with the consequence that both magnetization of the magnetic layer and also the operation of reading out the items of information stored in the magnetic layer can be effected more easily.

BRIEF DESCRIPTION OF THE DRAWING

Further features, details and advantages of the invention are apparent from the following description of a hot stamping foil having a decorative layer structure according to the invention, with reference to the drawing showing a highly diagrammatic view in section of a portion of a corresponding hot stamping foil, in which respect in particular the thickness relationships of the illustrated embodiment are not absolutely representative.

DESCRIPTION OF THE INVENTION

The hot stamping foil shown in the drawing includes in per se known manner a carrier film 1. Arranged on the carrier film 1 by way of a release layer 2 which for example consists of wax is a transfer layer assembly which is generally identified by reference 3.

Starting from the carrier film 1, the transfer layer assembly 3 includes a transparent cover lacquer layer 4 which, at its surface facing away from the carrier film 1, is provided at least in a region-wise manner with a spatial structure 5. The spatial structure 5 is of such a configuration and is of such dimensions that it can produce optical-diffraction effects, for example as a result of diffraction, refraction, etc. For example the spatial structure 5 can be a hologram or a computer-generated diffraction structure, but also for example a diffraction grating.

The spatial structure 5 is generally embossed into the cover lacquer layer 4 which is applied to the carrier film 1, for which purpose the decorative lacquer layer 4 is either a thermoplastic lacquer or a cross-linked lacquer which has not yet completely hardened at the time of embossing of the structure 5.

As can be clearly seen from the drawing some regions of the surface of the cover lacquer layer 4 having the spatial structure 5 are covered with a decorative lacquer layer 6, the decorative lacquer layer 6 being at least so thick that it completely fills up the depressions of the spatial structure 5. The decorative lacquer layer 6 must therefore be of a thickness which corresponds at least to the maximum depth d of the spatial structure 5.

A reflecting metal layer 7 is applied, for example by vacuum vapor deposition, to the surface of the cover lacquer layer 4, which faces away from the carrier film 1 and which is formed partly by the spatial structure 5 but partly also by the decorative lacquer layer 6.

Then, adjoining the metal layer 7 is a bonding layer 8 which provides for secure bonding of an adhesive layer 9. The adhesive layer 9 serves to fix the transfer layer assembly 3 on a substrate; after the transfer layer assembly 3 has been applied to the substrate, the carrier film 1 is pulled off in per se known manner. That is easily possible when using hot stamping foils for the reason that the release layer 2 becomes soft when suitably subjected to the effect of heat. The adhesive layer 9 is usually a heat-activatable layer which also becomes adhesive only during the transfer operation, by virtue of the heat which is employed in that situation.

The cover lacquer layer 4 is a transparent lacquer layer so that, after the transfer layer assembly 3 has been applied by means of the adhesive layer 9 to a substrate, the spatial structure 5 is visible through the cover lacquer layer 4. It will be appreciated that the cover lacquer layer can be colored in order to achieve special optical effects.

It is essential that the decorative lacquer layer 6 is adapted at least in respect of its base substance to the cover lacquer layer 4. In fact, the application of the decorative lacquer layer 6 is intended to provide that the interface between the cover lacquer layer 4 and the decorative lacquer layer 6 which has the spatial patterning 5 is not visible or is scarcely visible from the side of the carrier film 1 through the cover lacquer layer 4. This is ensured when the refractive indices of the cover lacquer layer 4 and the decorative lacquer layer 6 differ by less than 0.8.

As already mentioned, it is sufficient if the base substance of the decorative lacquer layer 6 substantially corresponds in regard to refractive index to the cover lacquer layer 4. Nonetheless the decorative lacquer layer 6 may also be pigmented, whereby it is possible for the regions carrying the decorative lacquer layer 6 to be differently colored relative to the regions, having only the spatial structure 5, of the decorative layer structure or the transfer layer assembly 3, so that the regions covered by the decorative lacquer 6 are clearly visible.

Production of a hot stamping foil in accordance with the illustrated embodiment is effected using the processes known from the production of stamping foils, for example in accordance with DE 34 22 910 C1.

The illustrated embodiment can use for example the following layers:

The carrier film 1 is for example a polyester foil of a thickness of 19 to 23 μm, to which then the cover lacquer layer 4 and the decorative lacquer layer 6 are applied by means of intaglio printing rollers. Between application of the cover lacquer layer 4 and the decorative lacquer layer 6, the surface of the cover lacquer layer 4, which faces away from the carrier film 1, is patterned for example by means of suitably patterned rollers, to produce the spatial structure 5.

In the normal case the cover lacquer layer 4 is from 0.3 to 1.2 μm in thickness and can be of the following composition:

| Component | Parts by weight |
| --- | --- |
| High-molecular PMMA-resin | 2,000 |
| Silicone alkyd oil-free | 300 |
| Non-ionic cross-linking agent | 50 |
| Methyl ethyl ketone | 750 |
| Low-viscosity nitrocellulose | 12,000 |
| Toluene | 2,000 |
| Diacetone alcohol | 2,500 |

The decorative lacquer layer 6 can be applied in a layer thickness of 0.5 to 2 μm and preferably comprises a high-molecular PMMA-resin with a glass-transition temperature $T_g=100°$ C. The decorative lacquer layer can be of the following composition:

| Component | Parts by weight |
| --- | --- |
| Methyl ethyl ketone | 30 |
| Ethyl acetate | 30 |
| Toluene | 19 |
| Polymethyl methacrylate ($T_g = 100°$ C.) | 21. |

The metal layer 7 which is applied by vapor deposition in a vacuum may comprise for example aluminium, chromium, copper, tin, silver or gold or alloys thereof. In the nominal case it is 0.01 to 0.04 μm in thickness.

Instead of the metal layer however it would also be possible to use dielectrics with a refractive index of at least 2 as the reflecting layer.

For example the following materials can be used as the dielectric:

Chemical elements such as for example Ge and In or oxides such as for example SiO, $Ta_2O_5$, $TiO_2$, $Ti_2O_3$, $CeO_2$, $HfO_2$ and $SiO_2$ or salts such as for example $MgF_2$ and ZnS.

The bonding layer 8 is usually 0.2 to 0.7 μm in thickness, in which respect, if the thickness of the bonding layer 8 is not sufficiently great, an interface configuration is afforded, in relation to the adhesive layer 9, similarly to the view illustrated in the drawing.

The bonding layer 8 can be for example of the following composition:

| Component | Parts by weight |
| --- | --- |
| High-molecular PMMA-resin | 1,200 |
| Methyl ethyl ketone | 3,400 |
| Toluene | 1,000 |
| Matting agent | 100. |

The adhesive of the layer 9 is for example applied in a thickness which approximately corresponds to the thickness of the cover lacquer layer 4. The adhesive layer 9 may be for example a per se known hot adhesive layer. However, it is not always necessary to apply that adhesive layer. That depends on the composition of the substrate on to which the stamping foil is to be stamped. If the substrate comprises for example PVC, as is frequently the case with credit cards, it is normally possible to omit a special hot adhesive layer. It is then just necessary to use a suitably thick bonding layer 8 having appropriate adhesive properties.

It will be appreciated that the layer structure is not necessarily provided in accordance with the illustrated embodiment. It would be possible for example for the decorative lacquer layer 6 to be composed in the form of a given pattern from differently colored lacquers or to use a magnetic lacquer layer as the decorative lacquer layer 6. Particularly when using magnetic pigments, it may also be found necessary to apply additional layers which are provided at least in a region-wise manner.

I claim:

1. A transfer layer assembly, which comprises:
   a transparent cover lacquer layer having a spatial surface providing an optical-diffraction effect;
   a decorative lacquer layer region-wise provided on said spatial surface and having a thickness corresponding at least to a depth (d) of said spatial surface, said decorative lacquer layer having a refractive index differing from a refractive index of said transparent cover lacquer layer by less than 0.8; and
   a reflective layer overlaying at least said decorative layer region-wise provided on said spatial surface.

2. The decorative layer structure as defined in claim 1, wherein said decorative lacquer layer is transparent.

3. The decorative layer structure as defined in claim 1 wherein said decorative lacquer layer includes pigments.

4. The decorative layer structure as defined in claims 1, 2 or 3, wherein said reflective layer is formed of a metal by vapor deposition.

5. The decorative layer structure as defined in claims 1, 2 or 3, wherein said reflective layer is formed by a dielectric having a refractive index of $\geq 2$.

6. A stamping foil, which comprises:
   a carrier film;
   a release layer disposed on said carrier film;
   a transfer layer assembly including a transparent layer disposed on said release layer, said transparent layer having a spatial surface providing an optical-diffraction effect; a decorative lacquer layer region-wise provided on said spatial surface of said transparent layer and having a thickness corresponding at least to a depth (d) of said spatial surface, said region-wise decorative lacquer layer having a refractive index differing by less than 0.8 from a refractive index of said transparent layer and a reflective layer overlaying at least said decorative lacquer layer on said spatial surface.

7. The stamping foil as defined in claim 6 wherein said region-wise decorative lacquer layer is transparent.

8. The stamping foil as defined in claim 6 wherein said region-wise decorative lacquer layer includes pigments.

9. The stamping foil as defined in claims 6, 7 or 8 wherein said reflective layer is formed by a dielectric having a refractive index of $\geq 2$.

10. The stamping foil as defined in claims 6, 7 or 8 wherein said reflective layer is formed of a metal by vapor deposition.

* * * * *